(12) United States Patent
Gupta et al.

(10) Patent No.: US 12,481,971 B2
(45) Date of Patent: *Nov. 25, 2025

(54) DISTRIBUTED PRIVATE LEDGER SYSTEMS AND METHODS

(71) Applicant: Citibank, N.A., New York, NY (US)

(72) Inventors: Saket Gupta, Bergenfield, NJ (US); Venkat Ramanathan, Cincinnati, OH (US)

(73) Assignee: Citibank, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/091,762

(22) Filed: Mar. 26, 2025

(65) Prior Publication Data

US 2025/0225490 A1    Jul. 10, 2025

Related U.S. Application Data

(63) Continuation of application No. 17/982,020, filed on Nov. 7, 2022, now Pat. No. 12,293,340, which is a (Continued)

(51) Int. Cl.
*G06Q 20/10*    (2012.01)
*G06Q 20/38*    (2012.01)
(Continued)

(52) U.S. Cl.
CPC .......... *G06Q 20/10* (2013.01); *G06Q 20/382* (2013.01); *G06Q 20/401* (2013.01); (Continued)

(58) Field of Classification Search
None
See application file for complete search history.

(56) References Cited

U.S. PATENT DOCUMENTS 6,665,865 B1 * 12/2003 Ruf ................. G06F 8/443
                                                    717/157
7,373,512 B1 *  5/2008 Just ................ H04L 63/0823
                                                    713/176
(Continued)

OTHER PUBLICATIONS

U.S. Appl. No. 17/982,020, filed Nov. 7, 2022, Pending.
U.S. Appl. No. 15/159,545, filed May 19, 2016, Patented, U.S. Pat. No. 11,521,185.

*Primary Examiner* — Patrick McAtee
(74) *Attorney, Agent, or Firm* — Perkins Coie LLP (57) ABSTRACT

A distributed private ledger function of a server of a first consortium member receives data representing an alias for one of its customers from the customer and also receives data that represents an alias for a customer of a second member replicated by a distributed private ledger function of a server of the second member to all members of the consortium. Thereafter, the distributed private ledger function of the first member's server identifies a recipient account of the second member's customer based on an account pointer associated with the alias of the second member's customer and initiates a transfer of funds from a source account of the first member's customer corresponding to an account pointer associated with the alias for the first member's customer to the identified recipient account of the second member's customer.

20 Claims, 6 Drawing Sheets

Related U.S. Application Data continuation of application No. 15/159,545, filed on May 19, 2016, now Pat. No. 11,521,185.

(51) Int. Cl.
 *G06Q 20/40* (2012.01)
 *H04L 9/40* (2022.01)

(52) U.S. Cl.
 CPC .......... *H04L 63/0272* (2013.01); *H04L 63/04* (2013.01); *H04L 63/08* (2013.01)

(56) References Cited

U.S. PATENT DOCUMENTS

| | | | | |
|---|---|---|---|---|
| 9,027,109 | B2* | 5/2015 | Wolberg-Stok | H04W 12/06 726/9 |
| 10,057,243 | B1* | 8/2018 | Kumar | H04L 9/0891 |
| 11,521,185 | B1* | 12/2022 | Gupta | H04L 63/04 |
| 2010/0275009 | A1* | 10/2010 | Canard | H04L 9/3013 713/155 |
| 2011/0078779 | A1* | 3/2011 | Liu | G06F 21/6254 726/28 |
| 2016/0253663 | A1* | 9/2016 | Clark | G06Q 20/341 705/75 |
| 2016/0260169 | A1* | 9/2016 | Arnold | G06Q 20/381 |
| 2016/0364721 | A1* | 12/2016 | Deliwala | G06Q 20/36 |
| 2017/0132630 | A1* | 5/2017 | Castinado | G06F 16/2255 |
| 2017/0230353 | A1* | 8/2017 | Kurian | G06Q 20/40 |
| 2017/0230375 | A1* | 8/2017 | Kurian | G06Q 20/382 |
| 2018/0114205 | A1* | 4/2018 | Thomas | G06Q 40/02 |
| 2018/0139042 | A1* | 5/2018 | Binning | G06F 21/6218 |
| 2018/0264347 | A1* | 9/2018 | Tran | G06V 40/28 |
| 2019/0052470 | A1* | 2/2019 | Park | H04L 9/3255 |
| 2019/0228386 | A1* | 7/2019 | Onnainty | H04L 9/3239 |
| 2019/0272537 | A1* | 9/2019 | Miller | G06Q 20/389 |
| 2021/0295303 | A1* | 9/2021 | Phan | G06Q 20/3274 |

* cited by examiner

FIG. 6

# DISTRIBUTED PRIVATE LEDGER SYSTEMS AND METHODS

CROSS REFERENCE TO RELATED APPLICATIONS

This application is a continuation of U.S. patent application Ser. No. 17/982,020, filed Nov. 7, 2022, which is a continuation of U.S. patent application Ser. No. 15/159,545 filed May 19, 2016. The content of the foregoing application is incorporated herein in its entirety by reference.

BACKGROUND OF THE INVENTION

The present invention relates generally to distributed ledger technology, and more particularly to technological solutions implementing a distributed private ledger and advancing peripheral technical fields.

Currently, there are a number of ways available for payors to perform person-to-person (P2P) payment transactions. For example, a payor may currently make a P2P payment to a recipient if the payor knows, for example, an email address or a mobile phone number for the recipient to which the payment may be made electronically. P2P payments by email address or mobile phone number represent newer methods of sending money to a recipient without resorting to the traditional model that involves, for example, writing a check to a payee and delivering the check in person or by postal mail to the payee.

A problem with such newer methods of making payments by email or telephone number is that they require the recipient to share the recipient's private information, such as the recipient's email address or phone number, with others. For example, a recipient may be reluctant to furnish such information to someone with whom the recipient is not well acquainted. Thus, sending or receiving payments by email or telephone number may not work well in many different use cases, such as fund raising activities in which neither payors nor recipients may wish to post or publicize their email addresses or mobile phone numbers.

There is a present need for technological solutions that address the problems of these legacy mechanisms and enable a mechanism that eliminates the requirements associated with these currently employed payment mechanisms for a recipient to share the recipient's private information, such as the recipient's email address or phone number, with others. The problem to be solved is rooted in technological limitations of the legacy approaches. Improved techniques, and in particular, improved application of technology is needed to address the problems of current mechanisms. More specifically, the technologies applied in the aforementioned legacy approaches fail to achieve the sought-after capabilities of the herein-disclosed techniques for improved distributed private ledger systems and methods.

SUMMARY OF THE INVENTION

Embodiments of the invention advance the technical fields for addressing problems associated with the above described currently employed payment mechanisms with technological solutions implementing improved distributed private ledger systems and methods, as well as advancing peripheral technical fields. Such embodiments are directed to technological solutions that may involve, for example, a system that comprises a server of a first entity-member of a consortium of member-entities, the server having one or more processors programmed to receive cryptographically signed data representing at least an alias for a customer of the first entity-member by a distributed private ledger function of the server of the first entity-member of the consortium of member-entities from a processor of a device of a customer of the first entity-member. The server receives cryptographically signed data representing at least an alias for a customer of a second entity-member by the distributed private ledger function of the server of the first entity-member of the consortium of member-entities replicated by a distributed private ledger function of a server of a second entity-member of the consortium of member-entities to distributed private ledger functions of servers of all other entity-members of the consortium of member-entities, including the distributed private ledger function of the server of the first entity-member of the consortium of member-entities.

In the system for such embodiments of the invention, the one or more processors of the server of the first entity-member of the consortium of member-entities may be further programmed, for example, to identify a recipient account of the customer of the second entity-member corresponding to an account pointer associated with the alias for the customer of the second entity-member received by the distributed private ledger function of the server of the first entity-member responsive to a search request received from the processor of the device of a customer of the first entity-member of the consortium of member-entities and to initiate a transfer of funds from a source account of the customer of the first entity-member corresponding to an account pointer. The account pointer is associated with the alias for the customer of the first entity-member received by the distributed private ledger function of the server of the first entity-member to the identified recipient account of the customer of the second entity-member responsive to a transfer request received from the processor of the device of the customer of the first entity-member of the consortium of member-entities.

In an aspect of embodiments of the invention, for example, the server of the first entity-member of the consortium of member-entities may be communicably coupled to the servers of all other entity-members of the consortium of member-entities, and the servers of all other entity-members of the consortium of member-entities may be communicably coupled to one another. In another aspect of embodiments of the invention, for example, the server of the first entity-member of the consortium of member-entities may be communicably coupled to the servers of all other entity-members of the consortium of member-entities via an application program interface gateway. In a further aspect of embodiments of the invention, for example, the servers of all other entity-members of the consortium of member-entities may be communicably coupled to one another via respective application program interface gateways.

In an additional aspect of embodiments of the invention, for example, the server of the first entity-member of the consortium of member-entities may be communicably coupled to the servers of all other entity-members of the consortium of member-entities via a private network. In still another aspect of embodiments of the invention, for example, the servers of all other entity-members of the consortium of member-entities may be communicably coupled to one another via the private network. In still further aspects, for example, the server of the first entity-member of the consortium of member-entities may be communicably coupled to the servers of all other entity-members of the consortium of member-entities via a virtual private network. In another aspect, for example, the servers of all other entity-members of the consortium of member-entities may be communicably coupled to one another via the virtual private network.

Other embodiments of the invention are directed to technological solutions that may involve a method that may comprise, for example, receiving, by a distributed private ledger function of a server of a first entity-member of a consortium of member-entities, data representing at least an alias for a customer of the first entity-member and receiving, by the distributed private ledger function of the server of the first entity-member, data representing at least an alias for a customer of a second entity-member replicated by a distributed private ledger function of a server of a second entity-member of the consortium of member-entities to distributed private ledger functions of servers of all other entity-members of the consortium of member-entities.

The method for such other embodiments of the invention may further comprise, for example, identifying, by the distributed private ledger function of the server of the first entity-member, a recipient account of the customer of the second entity-member based on an account pointer associated with the alias for the customer of the second entity-member received by the distributed private ledger function of the server of the first entity-member and initiating, by the distributed private ledger function of the server of the first entity-member, a transfer of funds from a source account of the customer of the first entity-member corresponding to an account pointer associated with the alias for the customer of the first entity-member received by the distributed private ledger function of the server of the first entity-member to the identified recipient account of the customer of the second entity-member.

In other aspects of embodiments of the invention, receiving the data representing at least the alias for the customer of the first entity-member may involve, for example, receiving cryptographically signed data representing at least the alias for the customer of the first entity-member by the distributed private ledger function of the server of the first entity-member of the consortium of member-entities. In further aspects of embodiments of the invention, receiving the data representing at least the alias for the customer of the first entity-member may involve, for example, receiving the data representing at least the alias for the customer of the first entity-member by the distributed private ledger function of the server of the first entity-member of the consortium of member-entities from a processor of a device of the customer of the first entity-member.

In a still further aspect of embodiments of the invention, receiving the data representing at least the alias for the customer of the first entity-member may involve, for example, replicating the cryptographically signed data representing at least the alias for the customer of the first entity-member by the distributed private ledger function of the server of the first entity-member of the consortium of member-entities to distributed private ledger functions of servers of all other entity-members of the consortium of member-entities. In still another aspect, receiving the data representing at least the alias for the customer of the second entity-member may involve, for example, receiving cryptographically signed data representing at least the alias for the customer of the second entity-member replicated from the distributed private ledger function of the server of the second entity-member of the consortium of member-entities to distributed private ledger functions of servers of all other entity-members of the consortium of member-entities.

In additional aspects of embodiments of the invention, identifying the recipient account of the customer of the second entity-member may involve, for example, identifying the recipient account of the customer of the second entity-member based on the account pointer associated with the alias for the customer of the second entity-member responsive to a search request received from the processor of the device of the customer of the first entity-member of the consortium of member-entities. In another aspect, identifying the recipient account of the customer of the second entity-member responsive to the search request may involve, for example, providing data representing a digital image of the customer of the second entity-member associated with the alias for the customer of the second entity-member to the device of the customer of the first entity-member of the consortium of member-entities responsive to the search request.

In other aspects of embodiments of the invention, initiating the transfer of funds from the source account of the customer of the first entity-member may involve, for example, initiating the transfer of funds from the source account of the customer of the first entity-member to the identified recipient account of the customer of the second entity-member responsive to a transfer request received from the processor of the device of the customer of the first entity-member of the consortium of member-entities. In another aspect, initiating the transfer of funds from the source account of the customer of the first entity-member to the identified recipient account of the customer of the second entity-member may involve, for example, depositing the funds from the source account of the customer of the first entity-member into the identified recipient account of the customer of the second entity-member responsive to the transfer request received from the processor of the device of the customer of the first entity-member of the consortium of member-entities.

Embodiments of the invention employ computer hardware and software, including, without limitation, one or more processors coupled to memory and non-transitory computer-readable storage media with one or more executable programs stored thereon which instruct the processors to perform the methods and systems described herein.

These and other aspects of the invention will be set forth in part in the description which follows and in part will become more apparent to those skilled in the art upon examination of the following or may be learned from practice of the invention. It is intended that all such aspects are to be included within this description, are to be within the scope of the present invention, and are to be protected by the accompanying claims.

DETAILED DESCRIPTION

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For example, features illustrated or described as part of one embodiment can be used in another embodiment to yield a still further embodiment. Thus, it is intended that the present invention cover such modifications and variations that come within the scope of the invention.

Embodiments of the invention provide technological solutions implementing distributed private ledger systems and methods that enable a user to create an alias that may be shared freely with others. For example, a user may create and store the user's alias on the distributed private ledger, which may also be referred to as a private blockchain. The distributed private ledger for embodiments of the invention may be controlled, for example, by a consortium of financial institutions, such as banks, which may wish to participate as members of the consortium. Each financial institution that is a member of such a consortium may have access to the aliases of users who are its own customers as well as the aliases of users who are customers of other members of the consortium. Thus, a user who is a customer of any one of the financial institutions that is a member of the consortium may register the user's alias in the distributed private ledger or blockchain for embodiments of the invention.

Financial institutions may currently employ digital channels, such as one or more mobile applications, for its customers' use. Financial institutions which are members of a consortium for embodiments of the invention may provide a mobile application function that enables a user who has an account with a consortium member to log in and create an alias for the user's account. Such an alias may comprise, for example, any letter, numeral, and/or symbol or combination of letters, numerals, and/or symbols that may be entered on a physical or virtual keypad of a device, such as a mobile phone, or it may be a particular word, number, or even a part of the user's actual name. An aspect of the distributed private ledger or blockchain for embodiments of the invention may be a requirement that each alias created and stored in the distributed private ledger is unique in the distributed private ledger. Thus, if a user attempts to register an alias that is the same as an alias previously registered in the distributed private ledger, the registration may be denied, and the user may be prompted to enter a different alias for registration.

Figure 1:
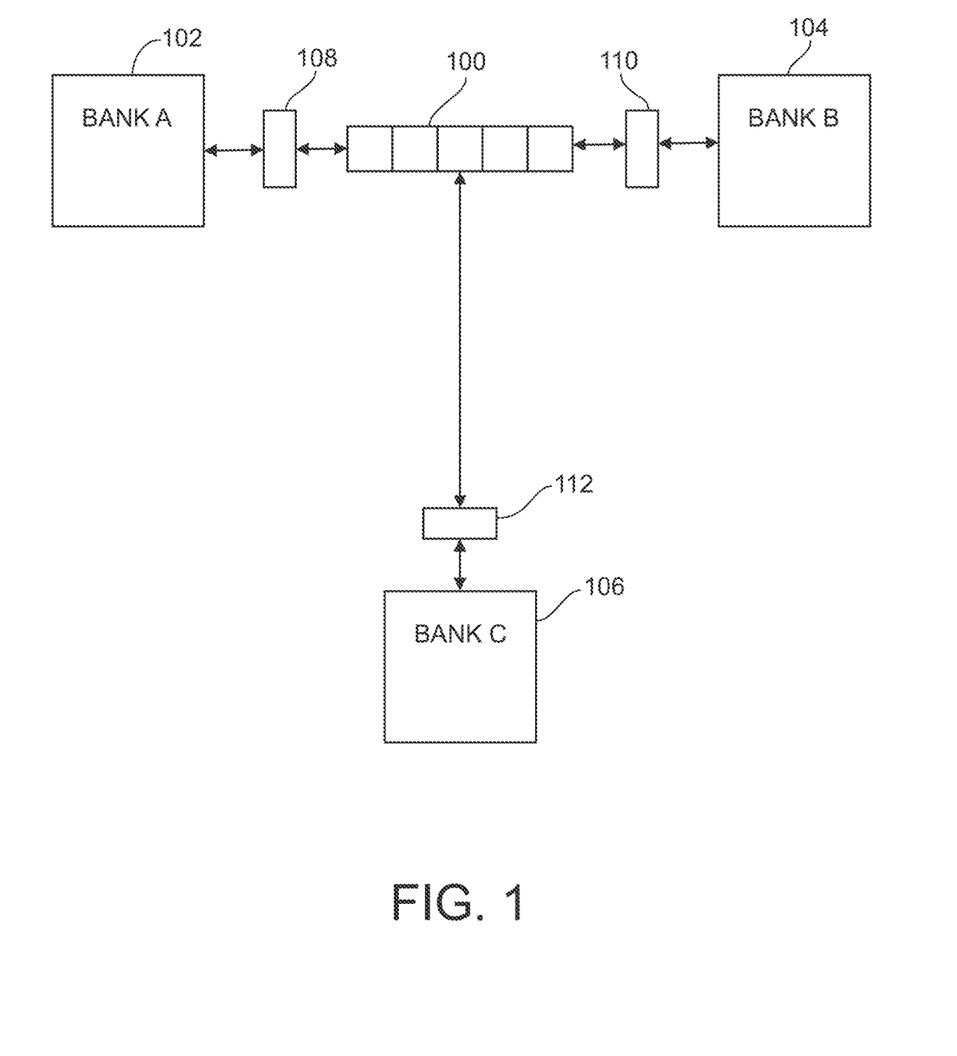
FIG. 1 is a schematic diagram that illustrates an example of components and flow of information between components for embodiments of the invention.

FIG. 1 is a schematic diagram that illustrates an example of components and flow of information between components for embodiments of the invention. Referring to FIG. 1, embodiments of the invention may employ a distributed private ledger or blockchain 100 that is shared, for example, by multiple financial institutions, such as Bank A 102, Bank B 104, and Bank C 106 that are each members of a consortium of financial institutions. It is to be understood that the distributed private ledger 100 for embodiments of the invention may likewise be shared, for example, by any number of other financial institutions or banks that are members of the consortium of financial institutions. Referring further to FIG. 1, the member banks, such as Bank A 102, Bank B 104, and Bank C 106, may each share the distributed private ledger 100, for example, via application program interface (API) gateways 108, 110, and 112, respectively.

Figure 2:
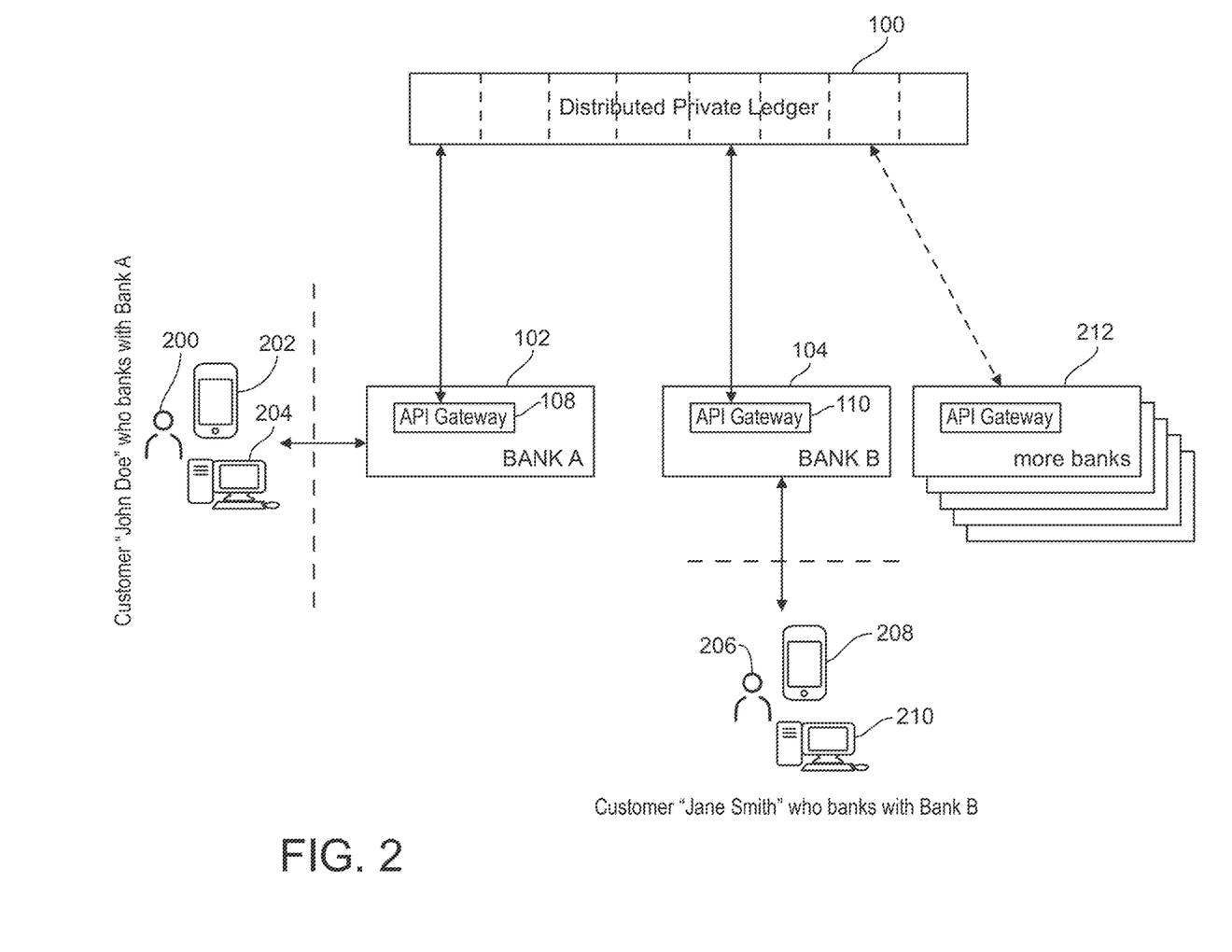
FIG. 2 is a schematic diagram that illustrates an example of interactive communications between external communication devices and components for embodiments of the invention.

FIG. 2 is a schematic diagram that illustrates an example of interactive communications between external communication devices and components for embodiments of the invention. Referring to FIG. 2, a first user 200 who is a customer of one of the members of the consortium, such as Bank A 102, may log in to a mobile application for Bank A on the first user's communication device, such as the first user's mobile phone 202 or laptop or desktop computer 204, and interact with one or more processors of Bank A 102. Referring further to FIG. 2, a second user 206 who is a customer of another member of the consortium, such as Bank B 104, may log in to a mobile application for Bank B on the second user's communication device, such as the second user's mobile phone 208 or laptop or desktop computer 210, and interact with one or more processors of Bank B 104. Likewise, users who are customers of other members of the consortium may log in to mobile applications for their respective banks 212, such as Bank C 106 shown in FIG. 1, on their communication devices and interact with one or more processors of their own banks.

Figure 3:
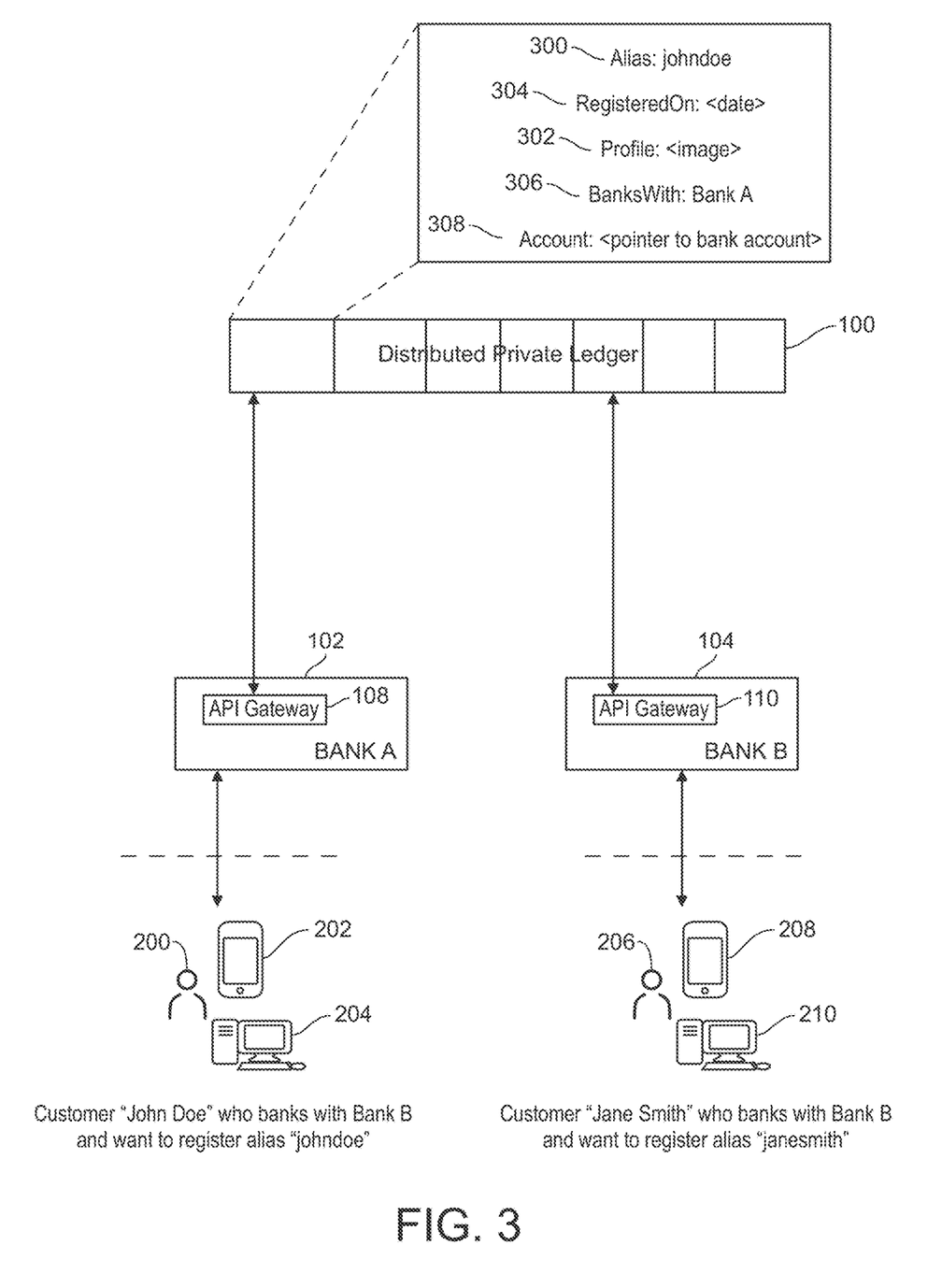
FIG. 3 is a schematic diagram that illustrates an example of a process of registration on a distributed private ledger for embodiments of the invention.

FIG. 3 is a schematic diagram that illustrates an example of a process of registration on a distributed private ledger for embodiments of the invention. Referring to FIG. 3, first user 200 who is a customer of Bank A 102 may log in to the mobile application for Bank A, for example, on the first user's mobile phone 202 and create and store a unique alias 300 of his or her own choice on the distributed private ledger 100, so long as the alias does not conflict with another alias that was previously registered on the distributed private ledger. Referring again to FIG. 3, optionally, the first user 200 may upload additional material, such as a profile photograph 302 of himself or herself to the distributed private ledger 100 at the same time as the alias is created and stored. Other information for the first user 200 may be stored with the first user's alias 300 on the distributed private ledger 100, such as a date of registration 304, the bank, such as Bank A 102, with which the first user has an account 306, and a pointer to a bank account 308 or account identifier, which may be a number for the account, such as a checking account or some other source account. Similarly, the second user 206 may likewise log in to the mobile application for his or her bank, such as Bank B 104, and create and store a unique alias of his or her own choice on the distributed private database 100, upload optional material, such as a profile photograph, and store other information, such as a date of registration, the bank with which the second user has an account, and a pointer to a bank account or account identifier, which may be a number for the account, such as a checking account or some other source account.

Figure 4:
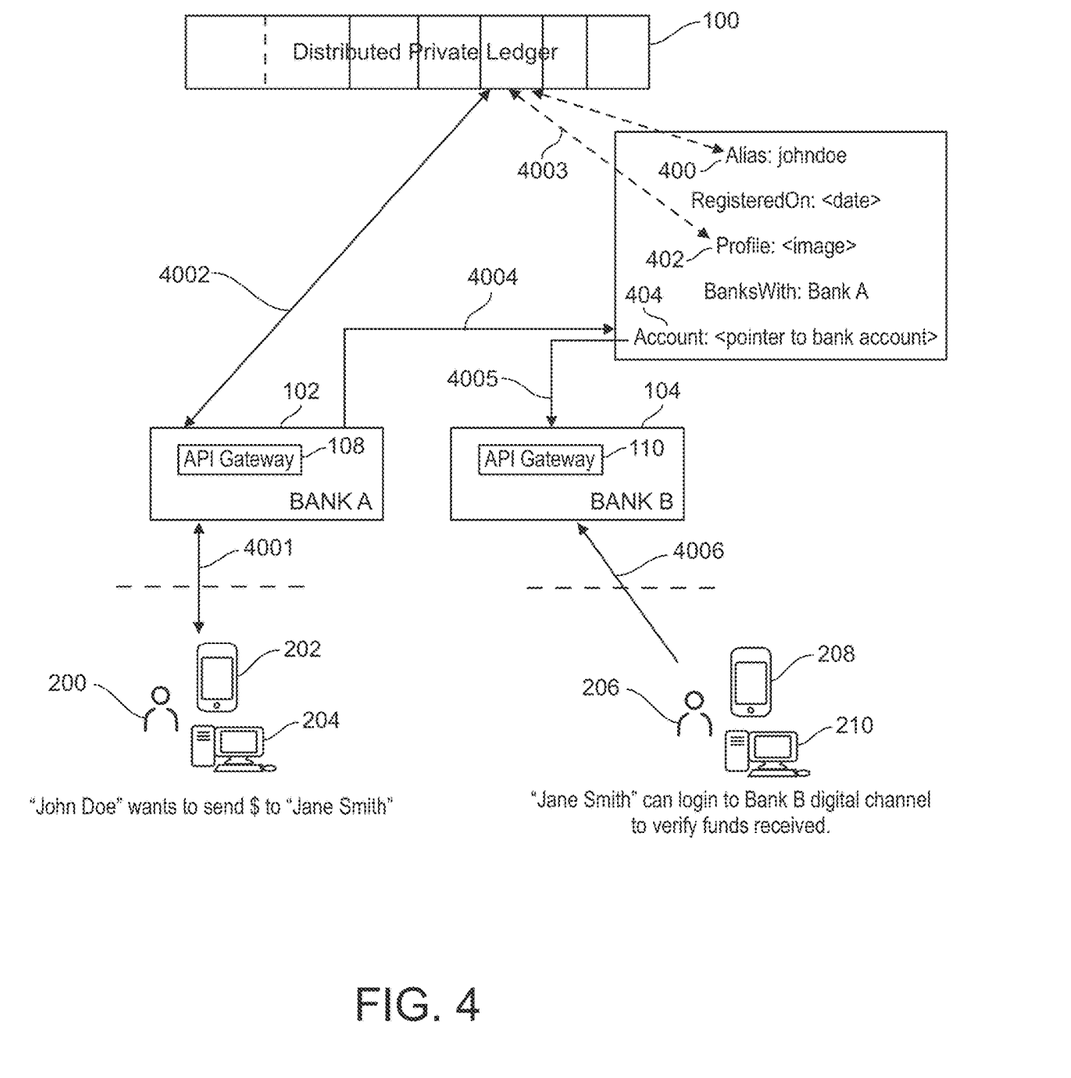
FIG. 4 is a schematic diagram that illustrates an example of a process employing the distributed private ledger for embodiments of the invention.

FIG. 4 is a schematic diagram that illustrates an example of a process employing the distributed private ledger for embodiments of the invention. Assume, for example, that the first registered user 200, who is a customer of Bank A 102, wishes to transfer funds to the second registered user 206, who is a customer of Bank B 104. Assume also that the first user 200 and the second user 206 are each aware that the other is registered on the distributed private ledger 100 shared by the consortium of financial institutions that includes their respective banks, such as Bank A 102 and Bank B 104, and that the first user 200 is aware of the alias of the second user 206. For example, the first and second users 200, 206 may have a conversation regarding an amount that the first user 200 intends to transfer to the second user 206 in payment of an obligation or for some other reason.

During such a conversation, the first and second users 200, 206 may also discover that they are both registered on the distributed private ledger 100 shared by the consortium of financial institutions of which their respective banks are members. The second user 206 may then inform the first user 200 of his or her registered alias in order to enable the transfer of funds. It is not necessary for either the first user 200 or the second user 206 to know anything else about the other party or the other party's account, such as the other party's phone number, email address, or bank. Further, knowledge of the alias is of no value or use to anyone outside of the transfer of funds from the first user to the second user. For example, mere knowledge of a user's alias does not afford any type of access to the user's account or even to the name of the bank with which the user has the account.

Referring to FIG. 4, at 4001, the first user 200 may log in to a digital channel of Bank A 102 via a mobile application, for example, on the first user's mobile phone 202. Once the first user 200 logs in to the digital channel of Bank A 102, at 4002, the first user 200 may, for example, enter a request to perform a lookup for the alias of the second user 206. Responsive to the request, the alias 400 for the second user 206 may be displayed on a display screen of the mobile phone 202 of the first user 200, which may verify to the first user that the second user is registered on the distributed private ledger 100. In addition, if the second user 206 uploaded a photograph 402 at the time the second user registered, at 4003, the photograph 402 of the second user may also be displayed on the display screen of the first user's mobile phone 202 in response to the search request for the alias, 400 which may further verify to the first user 200 that the second user is registered.

Referring to FIGS. 3 and 4, the first user 200 may enter an amount of funds to transfer from the first user's account with Bank A 102 corresponding to the account pointer 308 associated with the first user's alias 300 to an account with Bank B 104 corresponding to the account pointer 404 associated with the alias 400 registered by the second user 206 on the distributed private ledger 100. The alias 400 of the second user 206 may thus function as a pointer to the account of the second user with Bank B 104. Responsive to the entry, at 4004, Bank A 102 may initiate a transfer of the funds from the first user's account corresponding to the account pointer 308 with Bank A 102 associated with the alias 300 registered by the first user on the distributed private ledger 100 to the second user's account corresponding to the account pointer 404 associated with the alias 400 registered by the second user 206 on the distributed private ledger 100.

Referring again to FIG. 4, at 4005, the funds may be deposited into the account corresponding to the account pointer 404 of the second user 206 associated with the alias 400 registered by the second user on the distributed private ledger 100 for embodiments of the invention. It is to be understood that the API gateways 108 and 110 exposed by Bank A 102 and Bank B 104, respectively, facilitate movement of funds out of the first user's account at Bank A into the second user's account at Bank B. At 4006, the second user 206 may log into the mobile application on the second user's mobile phone 208 and access his or her bank account using his or her credentials to verify the deposit of the funds into his or her account with Bank B 104.

Figure 5:
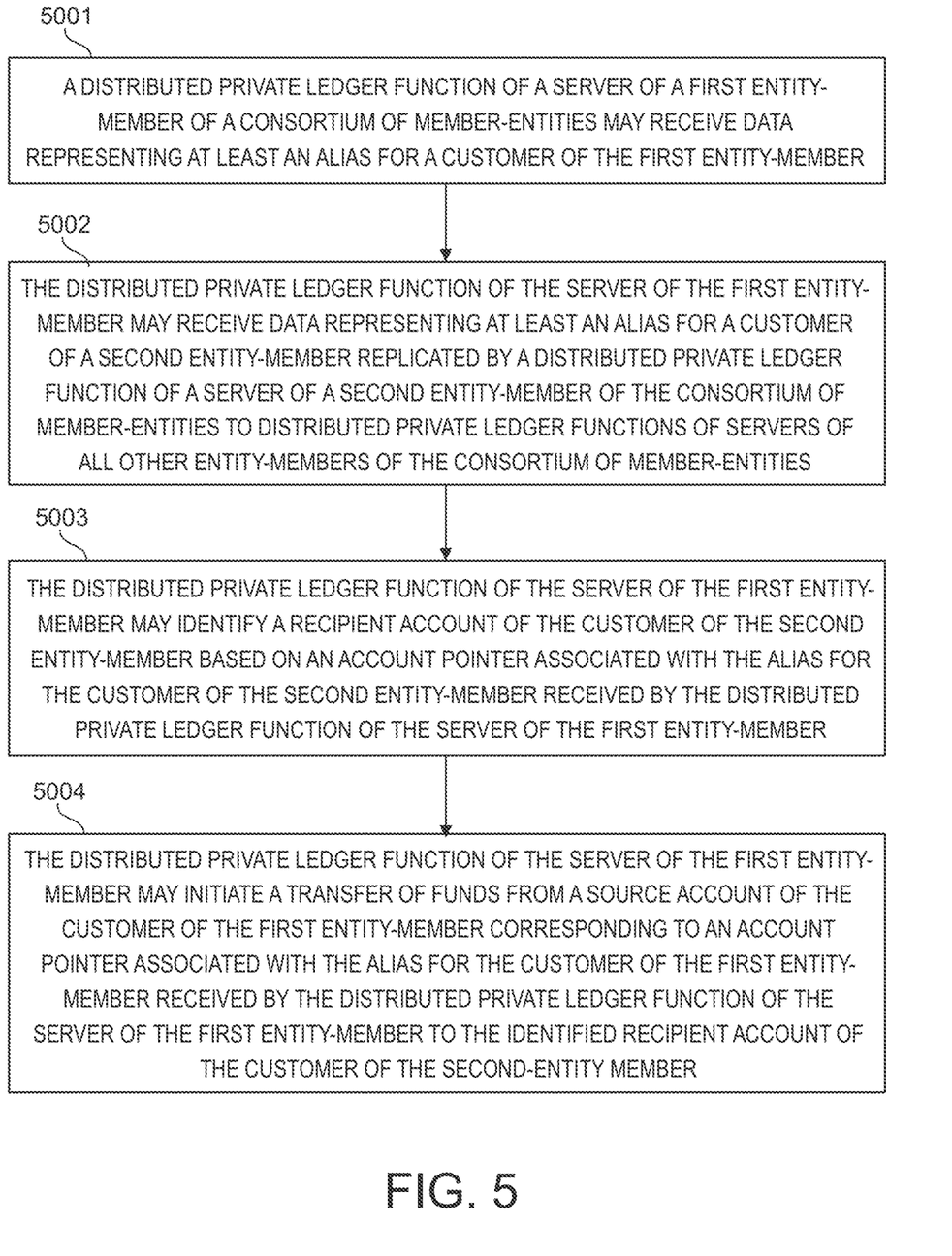
FIG. 5 is a flow diagram that illustrates an example of a distributed private ledger process for embodiments of the invention.

FIG. 5 is a flow diagram that illustrates an example of a distributed private ledger process for embodiments of the invention. Referring to FIG. 5, at 5001, a distributed private ledger function of a server of a first entity-member of a consortium of member-entities may receive data representing at least an alias for a customer of the first entity-member. At 5002, the distributed private ledger function of the server of the first entity-member may receive data representing at least an alias for a customer of a second entity-member replicated by a distributed private ledger function of a server of a second entity-member of the consortium of member-entities to distributed private ledger functions of servers of all other entity-members of the consortium of member-entities.

Referring further to FIG. 5, at 5003, the distributed private ledger function of the server of the first entity-member may identify a recipient account of the customer of the second entity-member based on an account pointer associated with the alias for the customer of the second entity-member received by the distributed private ledger function of the server of the first entity-member. At 5004, the distributed private ledger function of the server of the first entity-member may initiate a transfer of funds from a source account of the customer of the first entity-member corresponding to an account pointer associated with the alias for the customer of the first entity-member received by the distributed private ledger function of the server of the first entity-member to the identified recipient account of the customer of the second entity-member.

Figure 6:
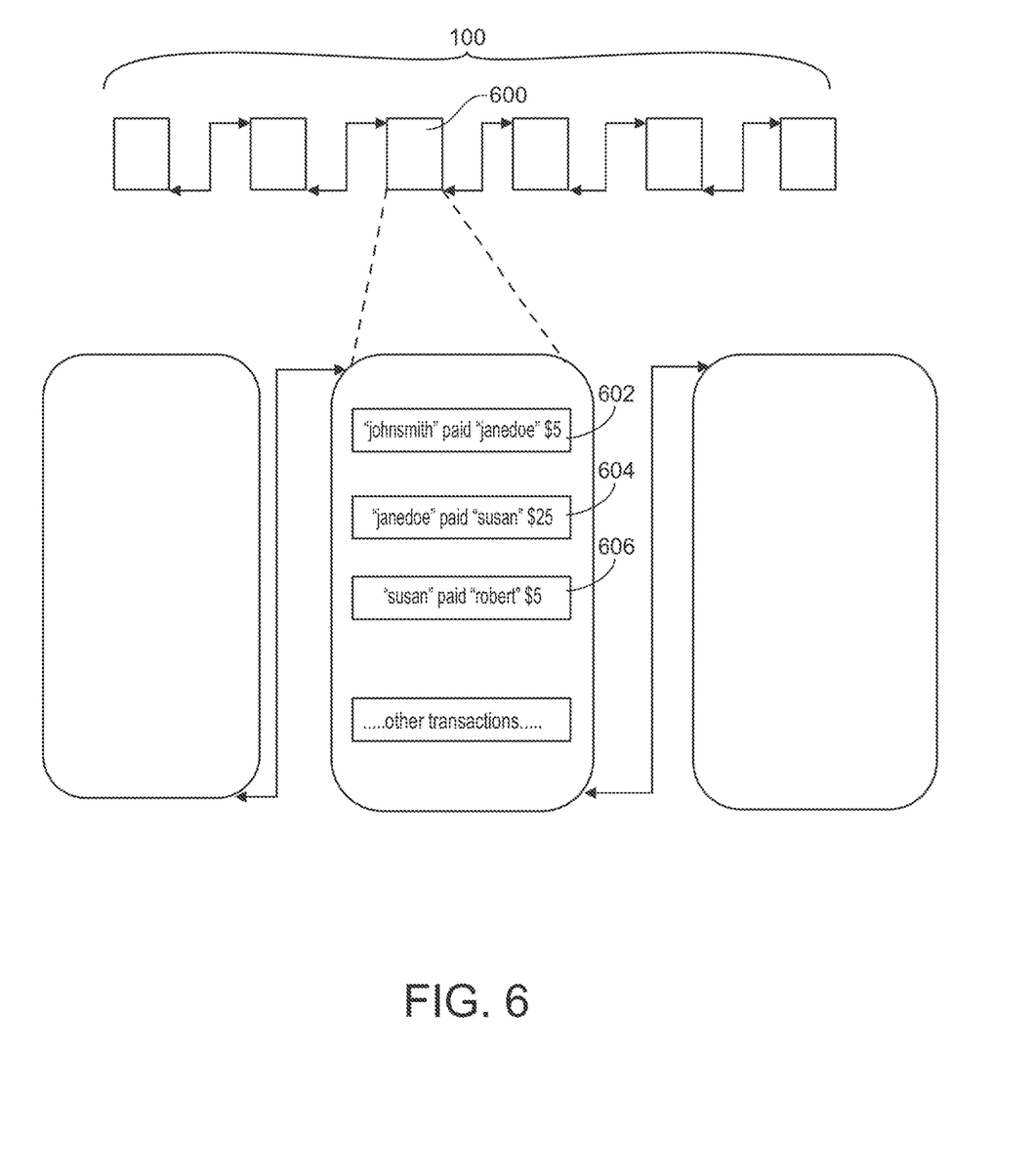
FIG. 6 is a schematic diagram that illustrates an example of a record of a transfer of funds saved as part of a block in the distributed private blockchain for embodiments of the invention.

An additional aspect of the distributed private blockchain ledger systems and methods for embodiments of the invention may be tracking transactions. In the tracking aspect, the distributed private blockchain ledger may server as a record of all transactions that occur over time. Such information may be used, for example, to settle transactions and/or disputes between financial institutions involved in particular transactions. FIG. 6 is a schematic diagram that illustrates an example of a record of a transfer of funds saved as part of a block in the distributed private blockchain for embodiments of the invention. Referring to FIG. 6, transactions may be bundled into blocks, such as block 600, of the distributed private blockchain 100. Each block of the distributed private blockchain 100, such as block 600, may contain data representing a number of transactions, such as transactions 602, 604, and 606.

In addition, each block may also include, for example, a hash of the preceding block's data. In this way, a chain of blocks comprising the distributed private blockchain for embodiments of the invention may be formed. The hash may act as a fingerprint or identifier that serves to keep the blocks in proper order. This may in turn minimize a risk of unauthorized changes to older blocks, which would require computationally intensive work to make changes to the hash in every block. Thus, data in a particular block, such as block 600, of the distributed private blockchain 100 representing transactions, such as transactions 602, 604, and 606, may be used, for example, to settle transactions and/or disputes between financial institutions, such as bank A 102 and bank B 104 involved in particular transactions such as illustrated in FIG. 4.

As noted, embodiments of the invention enable a user to transfer money without knowing the recipient's account number, phone number, email address, or anything else that can identify the recipient in any way or divulge any private information of the recipient. It is only necessary for the user to know the alias of the recipient, which may consist of all or part of the recipient's name or something that is entirely made up that bears no relationship to the recipient's identity or account. As also noted, the only entities that have access to the distributed private ledger or private blockchain for embodiments of the invention are the financial institutions, such as banks, that are members of the consortium of financial institutions which established and exclusively own and control the distributed private ledger.

A difference between a public blockchain and the distributed private ledger or private blockchain for embodiments of the invention, for example, is that the distributed private ledger is deployed in a private network to which only the members of the consortium that established the distributed private ledger have access. Thus, no person or entity may access the distributed private ledger for embodiments of the invention except those members of the consortium that created the distributed private ledger. Further, in order for members of the consortium to access and write to the distributed private ledger for embodiments of the invention, they must authenticate to the network using, for example, private key encryption.

It is to be noted that the distributed private ledger for embodiments of the invention may be used in transferring funds from any suitable type of source account to any suitable type of destination account. It is also to be noted that embodiments of the invention are not limited to transfers from an account of a user at one financial institution to an account of a user at a different financial institution but may include transfers of funds between accounts of users at the same institution. It is to be further noted that any number of financial institutions may be included in a consortium of financial institutions for embodiments of the invention. However, there may be certain criteria for financial institutions to enter the consortium, such as a requirement that all data entered by a member of the consortium on the distributed private ledger for embodiments of the invention must be replicated to all other members of the consortium, so that all registered user information is shared in the private blockchain by all consortium members.

It is to be understood that embodiments of the invention may be implemented as processes of a computer program product, each process of which is operable on one or more processors either alone on a single physical platform, such as a personal computer, or across a plurality of platforms, such as a system or network, including networks such as the Internet, an intranet, a WAN, a LAN, a cellular network, or any other suitable network. Embodiments of the invention may employ client devices that may each comprise a computer-readable medium, including but not limited to, random access memory (RAM) coupled to a processor. The processor may execute computer-executable program instructions stored in memory. Such processors may include, but are not limited to, a microprocessor, an application specific integrated circuit (ASIC), and or state machines. Such processors may comprise, or may be in communication with, media, such as computer-readable media, which stores instructions that, when executed by the processor, cause the processor to perform one or more of the steps described herein.

It is also to be understood that such computer-readable media may include, but are not limited to, electronic, optical, magnetic, RFID, or other storage or transmission device capable of providing a processor with computer-readable instructions. Other examples of suitable media include, but are not limited to, CD-ROM, DVD, magnetic disk, memory chip, ROM, RAM, ASIC, a configured processor, optical media, magnetic media, or any other suitable medium from which a computer processor can read instructions. Embodiments of the invention may employ other forms of such computer-readable media to transmit or carry instructions to a computer, including a router, private or public network, or other transmission device or channel, both wired or wireless. Such instructions may comprise code from any suitable computer programming language including, without limitation, C, C++, C#, Visual Basic, Java, Python, Perl, and JavaScript.

It is to be further understood that client devices that may be employed by embodiments of the invention may also comprise a number of external or internal devices, such as a mouse, a CD-ROM, DVD, keyboard, display, or other input or output devices. In general such client devices may be any suitable type of processor-based platform that is connected to a network and that interacts with one or more application programs and may operate on any suitable operating system. Server devices may also be coupled to the network and, similarly to client devices, such server devices may comprise a processor coupled to a computer-readable medium, such as a random access memory (RAM). Such server devices, which may be a single computer system, may also be implemented as a network of computer processors. Examples of such server devices are servers, mainframe computers, networked computers, a processor-based device, and similar types of systems and devices.

What is claimed is:

1. A system for securely conducting transactions based on user aliases, the system comprising:
    one or more processors coupled to memory, wherein the one or more processors execute application code instructions to cause the system to:
        store, within a first block in a distributed private blockchain ledger, data representing a first alias for a first user and first account identifier associated with a first user account, wherein the first alias does not comprise any personally identifiable data associated with the first user;
        identify, based on a second alias of a second user, a second user account of the second user having a second account identifier stored within a second block in the distributed private blockchain ledger;
        communicate instructions to a user device of the first user to display data representing the second alias of the second user;
        initiate, based on an interaction request received from the user device of the first user, creation of a third block in the distributed private blockchain ledger based on an interaction between the first user account of the first user and the second user account of the second user; and
        track the interaction within the third block in the distributed private blockchain ledger by storing a hash of the second block that maintains an order of the second block and the third block.

2. The system of claim 1, wherein the distributed private blockchain ledger is shared by one or more devices of a first entity-member of a consortium with one or more different devices of each of a plurality of other entity-members of the consortium.

3. The system of claim 2, wherein the one or more devices of the first entity-member are communicably coupled with one or more servers of the plurality of other entity-members of the consortium via an application program interface gateway.

4. The system of claim 2, the one or more devices of the first entity-member are communicably coupled to servers of the plurality of other entity-members of the consortium via a private network.

5. The system of claim 2, wherein the one or more devices of the first entity-member are communicably coupled to servers of the plurality of other entity-members of the consortium via a virtual private network.

6. The system of claim 1, wherein the application code instructions further cause the one or more processors to provide a graphical user interface on a customer device of a customer of a first entity-member, and wherein the graphical user interface the customer device of the customer of the first entity-member is configured to receive initiation of a transaction.

7. The system of claim 1, wherein the application code instructions further cause the one or more processors to:
cause a user computing device of the first user to display a graphical user interface, wherein the graphical user interface configured to receive initiation of the interaction and wherein the graphical user interface is further configured to receive a search entry from the first user, the search entry comprising search terms associated with an alias of a customer of the second user; and
cause the user computing device of the first user to display, on the graphical user interface, the second alias for the second user, wherein the second alias does not comprise any data that identifies any private information of the customer of the second user.

8. A method for securely conducting transactions based on user aliases, the method comprising:
storing, within a first block in a distributed private blockchain ledger, data representing a first alias for a first user and first account identifier associated with a first user account, wherein the first alias does not comprise any personally identifiable data associated with the first user;
identifying, based on a second alias of a second user, a second user account of the second user having a second account identifier stored within a second block in the distributed private blockchain ledger;
communicating instructions to a user device of the first user to display data representing the second alias of the second user;
initiating, based on an interaction request received from the user device of the first user, creation of a third block in the distributed private blockchain ledger based on an interaction between the first user account of the first user and the second user account of the second user; and
tracking the interaction within the third block in the distributed private blockchain ledger.

9. The method of claim 8, wherein the distributed private blockchain ledger is shared by one or more devices of a first entity-member of a consortium with one or more different devices of each of a plurality of other entity-members of the consortium.

10. The method of claim 9, wherein the one or more devices of the first entity-member are communicably coupled with one or more servers of the plurality of other entity-members of the consortium via an application program interface gateway.

11. The method of claim 9, wherein the one or more devices of the first entity-member are communicably coupled to servers of the plurality of other entity-members of the consortium via a private network.

12. The method of claim 9, wherein the one or more devices of the first entity-member are communicably coupled to servers of the plurality of other entity-members of the consortium via a virtual private network.

13. The method of claim 8, further comprising causing one or more devices to provide a graphical user interface on a customer device of a customer of a first entity-member, and wherein the graphical user interface the customer device of the customer of the first entity-member is configured to receive initiation of a transaction.

14. The method of claim 8, further comprising:
causing a user computing device of the first user to display a graphical user interface, wherein the graphical user interface configured to receive initiation of the interaction and wherein the graphical user interface is further configured to receive a search entry from the first user, the search entry comprising search terms associated with an alias of a customer of the second user; and
causing the user computing device of the first user to display, on the graphical user interface, the second alias for the second user, wherein the second alias does not comprise any data that identifies any private information of the customer of the second user.

15. The method of claim 8, further comprising tracking the interaction by storing a hash of the second block that maintains an order of the second block and the third block.

16. One or more non-transitory computer-readable media having computer-readable instructions recorded thereon, the computer-readable instructions causing one or more processors to perform operations comprising:
storing, within a first block in a distributed private blockchain ledger, data representing a first alias for a first user and first account identifier associated with a first user account, wherein the first alias does not comprise any personally identifiable data associated with the first user;
identifying, based on a second alias of a second user, a second user account of the second user having a second account identifier stored within a second block in the distributed private blockchain ledger;
communicating instructions to a user device of the first user to display data representing the second alias of the second user;
initiating, based on an interaction request received from the user device of the first user, creation of a third block in the distributed private blockchain ledger based on an interaction between the first user account of the first user and the second user account of the second user; and
tracking the interaction within the third block in the distributed private blockchain ledger.

17. The one or more non-transitory computer-readable media of claim 16, wherein the distributed private blockchain ledger is shared by one or more devices of a first entity-member of a consortium with one or more different devices of each of a plurality of other entity-members of the consortium.

18. The one or more non-transitory computer-readable media of claim 17, wherein the one or more devices of the first entity-member are communicably coupled with one or more servers of the plurality of other entity-members of the consortium via an application program interface gateway.

19. The one or more non-transitory computer-readable media of claim 17, wherein the one or more devices of the first entity-member are communicably coupled to servers of the plurality of other entity-members of the consortium via a private network.

20. The one or more non-transitory computer-readable media of claim 16, wherein the computer-readable instructions for tracking the interaction comprise storing a hash of the second block that maintains an order of the second block and the third block.

\* \* \* \* \*